United States Patent [19]

Niwa et al.

[11] Patent Number: 4,737,443

[45] Date of Patent: Apr. 12, 1988

[54] OPTICAL RECORDING MEDIUM

[75] Inventors: Toshio Niwa; Yukichi Murata, both of Kanagawa; Tetsuo Ozawa, Tokyo; Shuichi Maeda, Saitama; Yutaka Kurose, Kanagawa, all of Japan

[73] Assignee: Mitsubishi Chemical Industries Limited, Tokyo, Japan

[21] Appl. No.: 865,000

[22] PCT Filed: Sep. 2, 1985

[86] PCT No.: PCT/JP85/00487

§ 371 Date: May 5, 1986

§ 102(e) Date: May 5, 1986

[87] PCT Pub. No.: WO86/01460

PCT Pub. Date: Mar. 13, 1986

[30] Foreign Application Priority Data

Sep. 3, 1984 [JP] Japan .................................. 62-184317

[51] Int. Cl.$^4$ .......................... G03C 1/72; G01D 9/00; G01D 15/10; G11B 7/24
[52] U.S. Cl. ..................... 430/270; 430/495; 430/945
[58] Field of Search ............... 420/945, 270, 591, 562, 420/517, 495

[56] References Cited

U.S. PATENT DOCUMENTS

| 4,235,957 | 11/1980 | Kohrt et al. | 430/562 |
| 4,412,231 | 10/1983 | Namba et al. | 430/270 |
| 4,619,990 | 10/1986 | Elmasry | 430/495 |

FOREIGN PATENT DOCUMENTS

| 100116 | 8/1975 | Japan . |
| 212991 | 12/1983 | Japan . |
| 45195 | 3/1984 | Japan . |

OTHER PUBLICATIONS

Hackh's Chemical Dictionary, 3rd edition, edited by Julius Grant; McGraw-Hill Book Co. Inc. p. 439.

Primary Examiner—Paul R. Michl
Assistant Examiner—Mark R. Buscher
Attorney, Agent, or Firm—Sughrue, Mion, Zinn, Macpeak & Seas

[57] ABSTRACT

An optical recording medium in which recording and/or reproducing is made by the state changes of material owing to laser beams, comprising an indophenol-group dye supported on a substrate.

7 Claims, No Drawings

OPTICAL RECORDING MEDIUM

FIELD OF THE INVENTION

The present invention relates to an optical recording medium having an indophenol-group dye as an information recording layer.

More particularly, the present invention relates to an optical recording medium for performing recording by the use of the changes in state of material owing to the optical energy of oscillatory wavelength of a semiconductor laser.

PRIOR ART

Various optical recording media have been already known as the media of the kind described above.

For example, a medium having a layer of phthalocyanine-group dye on the substrate thereof has been disclosed in Japanese Patent Application (OPI) No. 97033/80 (the term "OPI" as used herein means an "unexamined published application"). The phthalocyanine-group dye has disadvantages of low sensitivity, insufficient deposition because of its high decomposing point, or the like. Further, a disadvantage is that the dye cannot be used for coating by application, because its solubility in organic solvent is very low.

A medium having a recording layer of phenalene-group dye, and a medium having a recording layer of naphthoquinone-group dye have been disclosed in Japanese Patent Application (OPI) Nos. 83344/83 and 224793/83, respectively. Such dyes have an advantage of easily depositing but reversely have a disadvantage of a low reflectivity. Because of the low reflectivity, the contrast relating to the reflectivity between a portion recorded by a laser beam and a non-recording portions becomes low, thereby making it difficult to reproduce recorded information. In addition, organic dyes generally have a disadvantage of low preservative stability.

DISCLOSURE OF THE INVENTION

An object of the present invention is to provide an optical recording medium using a dye being capable of depositing easily, being high soluble in organic solvent, being capable of coating by an application, having a high reflectivity, and being superior in contrast as well as in preservative stability.

The gist of the present invention exists in an optical recording medium in which recording and/or reproducing is made by the state changes of material owing to a laser beam, comprising an indophenol-group dye supported on a substrate.

BEST MODE FOR CARRYING OUT THE INVENTION

Various dyes can be used as the indophenol-group dye used in the optical recording medium of the present invention, and the example thereof is represented by general formula [I]

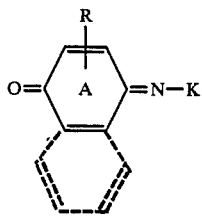

[I]

wherein =⟨A⟩= represents 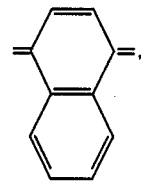 or

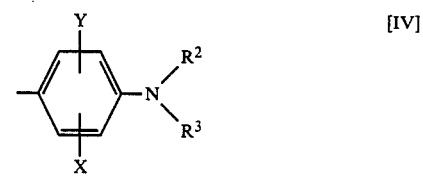

—K represents a substituted or unsubstituted aromatic amine residue, and —R represents a hydrogen atom, a halogen atom, a cyano group, a nitro group, a substituted or unsubstituted alkyl group, a substituted or unsubstituted alkoxy group, a substituted or unsubstituted aminocarbonyl group, a substituted or unsubstituted carbonylamino group, a substituted or unsubstituted aminosulfonyl group, a substituted or unsubstituted sulfonylamino group, or a substituted or unsubstituted thiocarbonylamino group.

In the general formula [I] described above, examples of the substituent on the alkyl group, alkoxy group, aminocarbonyl group, carbonylamino group, aminosulfonyl group, sulfonylamino group or thiocarbonylamino group include: an aryl group, such as a phenyl group, a naphthyl group or the like, possible to be substituted by a thiocyanato group, a nitro group, a halogen atom, a cyano group, an alkyl group, an alkylsulfonyl group, a hydroxyalkylsulfonyl group, an alkoxysulfonyl group, an alkoxyalkoxysulfonyl group, an allylsulfonyl group, an alkoxycarbonyl group, an alkoxyalkoxycarbonyl group, an alkoxyalkoxyalkoxycarbonyl group, an alkoxy group, an alkoxyalkoxy group, an alkoxyalkoxyalkoxy group, etc.; an alkyl group; an aralkyl group, such as a benzyl group or the like; a tetrahydrofurfuryl group; a cycloalkyl group, such as a cyclohexyl group or the like; an amino group, such as a phenylamino group, an alkylamino group, a dialkylamino group or the like; and a substituted or unsubstituted, penta- or hexa-heterocyclic residue having a nitrogen atom, an oxygen atom, or a sulfur atom, such as a nitrothiazolyl group, a nitrobenzothiazolyl group, an alkylthiothiadiazolyl group, a dicyanoalkyldiazolyl group, a bromobenzothiazole group or the like.

Examples of the substituted or unsubstituted aromatic amine residue represented by —K include tetrahydroquinolines, and groups represented by general formula [IV]

[IV]

wherein —X and —Y each represents a hydrogen atom, an alkyl group, an acylamino group, an alkoxy group, or halogen atom; —$R^2$ and —$R^3$ each represents a hydrogen atom; a $C_1$–$C_{20}$ substituted or unsubstituted alkyl group, aryl group or cyclohexyl group.

In the formula, examples of the substituent on the alkyl group, aryl group or cyclohexyl group represented by —$R^2$ and —$R^3$ include, for example, an alkoxy group, an alkoxyalkoxy group, an alkoxyalkoxyalkoxy group, an allyloxy group, an aryl group, an aryloxy group, a cyano group, a hydroxy group, a tetrahydrofuryl group, etc.

The indophenol-group dyes represented by the general formula [I] described above exhibit absorption in wavelength area of from 600 to 800 nm, and the molecular absorption coefficient thereof ranges from $10^4$ to $10^5$ cm$^{-1}$.

Of the indophenol-group dyes represented by the general formula [I], preferred examples include indophenol-group dyes represented by general formula [II]

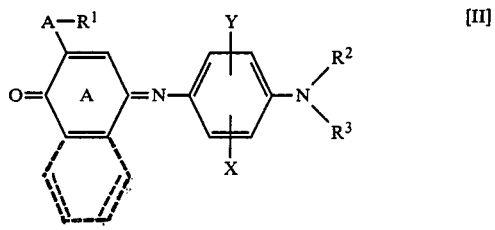

(wherein =A=, —$R^2$, —$R^3$, —X and —Y represent the same meaning as defined above, —$R^1$ represents a hydrogen atom; a $C_1$–$C_{20}$ substituted or unsubstituted alkyl group, aryl group or cyclohexyl group; or a substituted or unsubstituted penta- or hexa-heterocyclic residue having a nitrogen atom, an oxygen atom, or a sulfur atom; and —A— represents —CONH—, —NHCO—, —$SO_2NH$—, —NHCONH—, —$NHSO_2NH$—, or —NHCSNH—), and indophenol-group dyes represented by general formula [III]

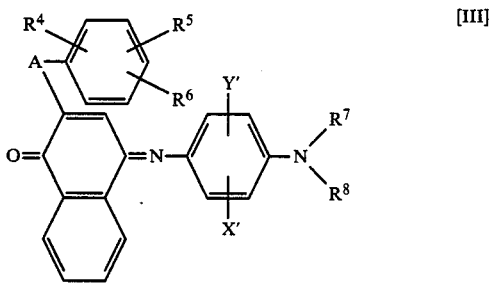

[wherein —A— represents the same meaning defined above, —X' and —Y' each represents a hydrogen atom, a $C_1$–$C_4$ alkyl group, a $C_1$–$C_4$ acylamino group, a $C_1$–$C_4$ alkoxy group, or a halogen atom, —$R^7$ and —$R^8$ each represents a hydrogen atom, an aralkyl group, a cyanoalkyl group, or a group represented by —($C_2H_4O$)$_l$$R^9$ (in which —$R^9$ represents a $C_1$–$C_{10}$ alkyl group, and l represents an integer of $6 \geq l \geq 0$, preferably an integer of $4 \geq l \geq 0$), —$R^4$, —$R^5$ and —$R^6$ each represents a hydrogen atom, a nitro group, a cyano group, a thiocyanato group, a halogen atom, an alkyl group, a hydroxy group, a group represented by —($OC_2H_4$)$_m$$OR^{10}$ (in which —$R^{10}$ represents an alkenyl group, or a $C_1$–$C_{10}$ alkyl group, and m represents an integer of $6 \geq m \geq 0$, preferably an integer of $4 \geq m \geq 0$), a group represented by —CO($OC_2H_4$)$_n$$OR^{11}$ (in which —$R^{11}$ represents an alkenyl group, or a $C_1$–$C_{10}$ alkyl group, and n represents an integer of $6 \geq n \geq 0$, preferably an integer of $4 \geq n \geq 0$), a group represented by —$SO_2R^{12}$ (in which —$R^{12}$ represents a $C_1$–$C_{10}$ alkyl group, a $C_3$–$C_{10}$ alkoxyalkyl group, a $C_2$–$C_{10}$ hydroxyalkyl group, or a vinyl group), or a group represented by —$SO_3R^{13}$ (wherein —$R^{13}$ represents a $C_1$–$C_{10}$ alkyl group, a $C_3$–$C_{10}$ alkoxyalkyl group, a $C_2$–$C_{10}$ hydroxyalkyl group, or a vinyl group), and —A— represents —CONH—, or —$SO_2NH$—].

In the present invention, general synthesis of the indophenol-group dye supported on the substrate can be made, for example, in the manner as disclosed in the description by P. W. Vittum and G. H. Brown, J. Am. Soc. Chem., 68 2235 (1946).

While the optical recording medium of the present invention is basically constituted of a substrate and a recording layer, a subbing layer may be provided on the substrate or a protection layer may be provided on the recording layer if necessary.

Any of materials transparent or opaque with respect to the laser beam used can be employed for the substrate of the present invention. Examples of the materials of the substrate are supports for general recording materials, such as glass, plastic, paper, plate-like or foil-like metal, and the like. The preferred is plastic in view of various aspects. Examples of the plastic include acrylic resin, methacrylic resin, vinyl acetate resin, vinyl chloride resin, nitrocellulose, polyethylene resin, polypropylene resin, polycarbonate resin, polyimide resin, polysulfone resin, etc.

In the case that the indophenol-group dye is used as an information recording layer in the optical recording medium of the present invention, the film thickness thereof ranges from 100 Å to 5 μm, preferably from 1000 Å to 3 μm. With respect to the method of making the film, general methods for making thin film, such as a vacuum deposition method, a sputtering method, a doctor blade coating method, a cast coating method, a spinner coating method, a dip coating method, etc., can be used in the invention. If necessary, a binder can be used. Examples of the binder used include known materials, such as PVA, PVP, nitrocellulose, cellulose acetate, polyvinylbutyral, polycarbonate, etc. It is desired that the weight proportion of the indophenol-group dye to the resin is 0.01 or more. In the case that a spinner coating method is used as a method of making film, the rev number is preferably from 500 to 5000 rpm, and if necessary, a treatment such as heating or applying solvent steam may be made after spin coating. To improve stability and light durability of the recording medium, the medium may contain transition metal chelate compounds as singlet oxygen quencher, for example, acetyl acetonate chelate, bisphenyldithiol, salicylaldehyde oxime, bisdithio-α-diketone, etc. Further, if necessary, other dyes can be used in combination. Examples of the other dyes are other indophenol-group dyes, and different group dyes, such as triarylmethane group dyes, azo dyes, cyanine-group dyes, squalillium-group dyes, etc.

With respect to solvent in the case where the recording layer is produced by the above-mentioned methods, that is, a doctor blade coating method, a cast coating method, a spinner coating method, a dip coating method, etc., particularly in the spinner coating method, solvent having a boiling point of from 120° C. to 160° C. is preferably used. Examples of the solvent include bromoform, dibromoethane, ethylcellosolve, xylene, chlorobenzene, cyclohexanone, etc.

The recording layer in the optical recording medium of the present invention may be formed on both sides of the substrate or may be provided to only on one side of the substrate.

Recording information onto the recording medium thus obtained is made by the radiation of focused laser beams, more preferably semiconductor laser beams, of about 1 μm to the double-side or single-side of the recording layer. Thermal transformation in the recording layer owing to the absorption of laser energy, such as decomposition, evaporation, melt or the like, occurs on a portion irradiated with the laser beams.

The reproduction of the recorded information is made by reading the difference of the reflectivity between the non-transformed portion and the thermal transformed portion.

Examples of the laser beams used for the optical medium of the present invention include $N_2$, He-Cd, Ar, He-Ne, ruby, semiconductor and dye laser, and semiconductor laser is preferred because of its characteristics, such as lightness in weight, easily handling, compactness, etc.

While the present invention will be described hereinafter in more detail with reference to specific examples, the invention is not limited to the specific examples.

EXAMPLE 1

An indophenol-group dye having the following structural formula was heated to a temperature of from about 80° C. to about 150° C. under a vacuum of $2 \times 10^{-5}$ Torr and deposited under a vacuum onto a 12 mm thick substrate of methacrylic resin (hereinafter abbreviated to "PMMA"). The deposited film thickness was 2015 Å by way of the vacuum deposited film thickness measuring by using a quartz oscillation-type film thickness gage. The maximum absorption wavelength measured with a spectrophotometer was 650 nm, and the form of the spectrum was broad.

Indophenol-group Dye:

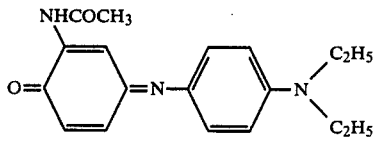

Writing was made upon the thus obtained thick film by the use of He-Ne laser as a light source with a beam diameter of 2.4 μm and with a wavelength of 632.8 nm to obtain a pit of uniform and clear form. The carrier level/noise level (C/N) ratio thereof was good; 45 dB.

In addition, the recording medium expressed good preservativeness under the conditions of 40° C. temperature and 90% humidity in room light.

EXAMPLE 2

An indophenol-group dye represented by the following structural formula

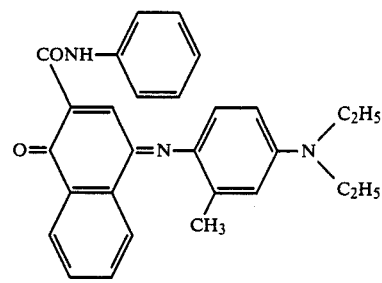

was deposited under a vacuum onto a PMMA substrate in the manner described in Example 1.

The deposited film thickness was 2020 Å by way of the vacuum deposited film thickness measuring by using a quartz oscillation-type film thickness gage.

The maximum absorption wavelength measured with a spectrophotometer was 735 nm, and the form of the spectrum was broad.

Writing was made upon the thus obtained thick film by the use of a semiconductor laser with a mean wavelength of 780 nm, as a light source, with a beam diameter of 1 μm to obtain a pit of uniform and clear form. The C/N ratio thereof was good; 50 dB.

In addition, the recording medium expressed good preservativeness under the conditions of 40° C. temperature and 90% humidity in room light.

EXAMPLE 3

A mixture obtained by dissolving 0.2 g of a dye represented by the following structural formula

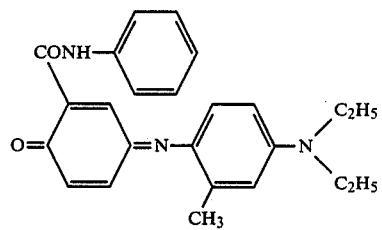

in 20 ml of chloroform was rotarily applied onto a 1.1 mm thick glass substrate and dried at 100° C. under reduced pressure to prepare a 0.2 μm thick recording medium.

The maximum absorption wavelength measured with a spectrophotometer was 755 nm, and the form of the spectrum was broad.

Information recording was made upon the thus obtained recording medium in the manner of Example 1 to obtain a pit of uniform and clear form.

EXAMPLE 4

Replacing the indophenol-group dye used in Example 2 by each of compounds shown in Table 1, each of thick-film substrates having the maximum absorption wavelength shown in Table 1 was prepared by deposition. Recording was made upon the thus obtained thick film by the use of a semiconductor laser as a light source to obtain a pit of uniform and clear form. The C/N ratio thereof was good and the preservativeness thereof was good.

TABLE 1

| No. | Structural Formula of Dye | Max. Absorption Wavelength (nm) on Evaporated Substrate (PMMA) |
|---|---|---|
| 4-1 | CONH-Ph; O=...=N-C6H3(CH3)-N(C4H9(n))2 | 740 |
| 4-2 | CONH-Ph; O=...=N-C6H3(NHCOCH3)-N(C2H5)2 | 751 |
| 4-3 | CONH-Ph; O=...=N-C6H3(CH3)-N(C4H9(n))2 | 760 |
| 4-4 | CONH-Ph; O=...=N-C6H3(CH3)-N(C2H5)(C4H9(n)) | 758 |
| 4-5 | CONH-C6H4-NO2; O=...=N-C6H3(CH3)-N(C2H5)2 | 762 |
| 4-6 | CONH-Ph; O=...=N-C6H3(NHCOC2H5)-N(C2H5)2 | 776 |
| 4-7 | CONH-Ph; O=...=N-C6H3(NHCHO)-N(C2H5)2 | 773 |
| 4-8 | CONH-Ph; O=...=N-C6H3(CH3)-N(C8H17(n))2 | 762 |
| 4-9 | CONH-Ph; O=...=N-C6H2(OCH3)(NHCOCH3)-N(C2H5)2 | 780 |
| 4-10 | CONH-Ph; O=...=N-C6H2(OC2H5)(NHCOCH3)-N(C2H5)2 | 781 |
| 4-11 | CONH-Ph; O=...=N-C6H2(OCH3)(NHCOCH3)-N(C2H5)2 | 758 |
| 4-12 | CONH-Ph; O=...=N-C6H3(NHCOC2H5)-N(C2H4OCH3)(C2H5) | 749 |
| 4-13 | CONH-Ph; O=...=N-C6H2(OC2H5)(NHCOCH3)-N(C2H5)2 | 758 |
| 4-14 | CONH-Ph; O=...=N-C6H2(OCH3)(CH3)-N(C2H5)2 | 753 |
| 4-15 | CONH-Ph; O=...=N-C6H2(OCH3)(CH3)-N(C2H5)2 | 775 |
| 4-16 | CONH-C6H4-Cl; O=...=N-C6H3(CH3)-N(C2H5)(C6H11) | 757 |
| 4-17 | CONH-C6H4-CN; O=...=N-C6H3(CH3)-N(C2H5)2 | 745 |
| 4-18 | CONH-C6H4-CN; O=...=N-C6H3(CH3)-N(C4H9(n))2 | 750 |

TABLE 1-continued

| No. | Structural Formula of Dye | Max. Absorption Wavelength (nm) on Evaporated Substrate (PMMA) |
|---|---|---|
| 4-19 | (structure) | 755 |
| 4-20 | (structure) | 760 |
| 4-21 | (structure) | 760 |
| 4-22 | (structure) | 760 |
| 4-23 | (structure) | 742 |
| 4-24 | (structure) | 740 |
| 4-25 | (structure) | 755 |
| 4-26 | (structure) | 730 |
| 4-27 | (structure) | 741 |
| 4-28 | (structure) | 730 |
| 4-29 | (structure) | 748 |
| 4-30 | (structure) | 732 |
| 4-31 | (structure) | 743 |
| 4-32 | (structure) | 744 |

EXAMPLE 5

Replacing the indophenol-group dye used in Example 1 by each of compounds shown in Table 2, each of thick-film substrates having the maximum absorption wavelength shown in Table 2 was prepared by deposition. Recording was made upon the thus obtained thick film by the use of a He-Ne laser as a light source to obtain a pit of uniform and clear form. The C/N ratio thereof was good and preservativeness thereof was good.

TABLE 2

| No. | Structural Formula of Dye | Max. Absorption Wavelength (nm) on Evaporated Substrate (PMMA) |
|---|---|---|
| 5-1 | (quinone-imine dye with NHCOCH$_3$, Cl, N(C$_2$H$_5$)$_2$) | 626 |
| 5-2 | (quinone-imine dye with NHCOCH$_3$, Cl, NHCOCH$_3$, N(C$_2$H$_5$)$_2$) | 658 |
| 5-3 | (quinone-imine dye with NHCO-phenyl, N(C$_2$H$_5$)$_2$) | 645 |
| 5-4 | (quinone-imine dye with NHCO-cyclohexyl (H), N(C$_2$H$_5$)$_2$) | 647 |
| 5-5 | (quinone-imine dye with NHCO–CH$_3$, N(C$_2$H$_5$)(CH$_2$-phenyl)) | 644 |
| 5-6 | (quinone-imine dye with NHCOCH$_3$, N(C$_2$H$_5$)(C$_2$H$_4$-phenyl)) | 648 |
| 5-7 | (naphthoquinone-imine dye with CONH-phenyl, Cl, N(CH$_3$)$_2$) | 690 |
| 5-8 | (naphthoquinone-imine dye with CONH–C$_2$H$_5$, N(C$_2$H$_5$)(CH$_2$-phenyl)) | 650 |

TABLE 2-continued

| No. | Structural Formula of Dye | Max. Absorption Wavelength (nm) on Evaporated Substrate (PMMA) |
|---|---|---|
| 5-9 | (naphthoquinone with CONH—CH₂—(tetrahydrofuryl) substituent; =N—C₆H₄—N(C₂H₄OCH₃)(C₂H₅)) | 655 |
| 5-10 | (naphthoquinone with CONHCH₃ substituent; =N—C₆H₄—N(C₂H₅)(C₂H₄CN)) | 644 |
| 5-11 | (benzoquinone with NHCOC₂H₅ substituent; =N—C₆H₄—N(C₂H₅)₂) | 650 |
| 5-12 | (benzoquinone with NHCOCH₂—C₆H₅ substituent; =N—C₆H₄—N(C₂H₅)₂) | 643 |
| 5-13 | (naphthoquinone with NHC(O)NH—C₆H₅ substituent; =N—C₆H₄—N(C₂H₅)₂) | 650 |
| 5-14 | (naphthoquinone with NHC(O)NH—C₆H₅ substituent; =N—C₆H₃(CH₃)—N(C₂H₅)₂) | 670 |

TABLE 2-continued

| No. | Structural Formula of Dye | Max. Absorption Wavelength (nm) on Evaporated Substrate (PMMA) |
|---|---|---|
| 5-15 | | 650 |
| 5-16 | | 615 |
| 5-17 | | 670 |
| 5-18 | | 640 |
| 5-19 | | 640 |

TABLE 2-continued

| No. | Structural Formula of Dye | Max. Absorption Wavelength (nm) on Evaporated Substrate (PMMA) |
|---|---|---|
| 5-20 | 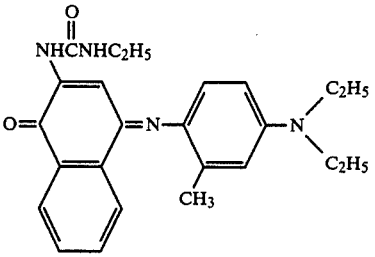 | 665 |

EXAMPLE 6

A mixture obtained by dissolving 1 g of an indophenol-group dye having the following structural formula in 50 g of dibromoethane was filtered with 0.22 μm filter to obtain a solution. With dropping 2 ml of the solution onto a PMMA resin substrate (120 mmφ) provided with a 700 Å deep and 0.7 μm wide groove of ultraviolet-rays hardening resin, the dye was applied to the substrate with the rev number of 1200 rpm by a spinner coating method. After the application, the dye was dried at 60° C. for 10 minutes. Under the same conditions the dye was applied to a glass substrate, and the film thickness thereof measured by α-step was 1500 Å. The maximum absorption wavelength of the coat film was 760 nm, and the form of the spectrum was broad.

Indophenol-group Dye:

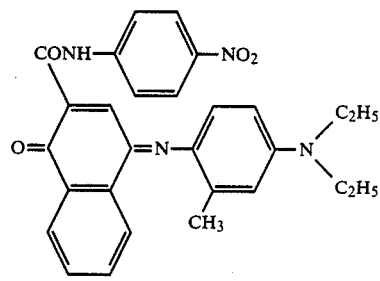

Semiconductor laser beams with a mean wavelength of 830 nm were radiated to the coated film under the conditions of 6 mW output and 1 μm beam diameter to obtain an about 1 μm wide and about 2 μm long very clear pit. The C/N ratio thereof was 48 dB. The preservativeness (60° C., 80%RH) thereof was good.

EXAMPLE 7

Replacing the indophenol-group dye used in Example 6 by each of compounds shown in Table 3, each of thick-film substrates having the maximum absorption wavelength shown in Table 3 was prepared by coating. Recording was made upon the thus obtained thick film by the use of a semiconductor laser as a light source to obtain a pit of uniform and clear form. The C/N ratio thereof was good and the preservativeness thereof was good.

TABLE 3

| No. | Structural Formula of Dye | Max. Absorption Wavelength (nm) on Thin Film (Applied Film) |
|---|---|---|
| 7-1 | 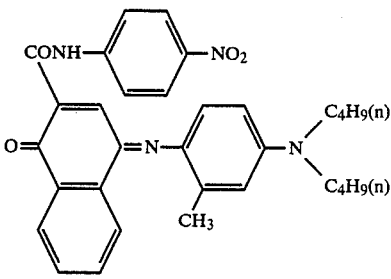 | 765 |

TABLE 3-continued

| No. | Structural Formula of Dye | Max. Absorption Wavelength (nm) on Thin Film (Applied Film) |
|---|---|---|
| 7-2 | (structure with CONH-C₆H₄-NO₂, naphthoquinone imine, N(C₅H₁₁(n))₂, CH₃) | 765 |
| 7-3 | (structure with CONH-C₆H₄-NO₂, naphthoquinone imine, N(C₃H₇(n))₂, CH₃) | 765 |
| 7-4 | (structure with CONH-C₆H₄-NO₂, naphthoquinone imine, N(C₂H₅)(C₂H₄OH), CH₃) | 755 |
| 7-5 | (structure with CONH-C₆H₄-NO₂, naphthoquinone imine, N(C₂H₅)(C₂H₄OCH₃), CH₃) | 750 |
| 7-6 | (structure with CONH-C₆H₄-NO₂, naphthoquinone imine, N(C₄H₉(n))(C₂H₄OH), CH₃) | 758 |

TABLE 3-continued

| No. | Structural Formula of Dye | Max. Absorption Wavelength (nm) on Thin Film (Applied Film) |
|---|---|---|
| 7-7 | [naphthoquinone with CONH-C6H4-NO2, =N-C6H3(CH3)-N(C4H9(n))(C2H4OCH3)] | 755 |
| 7-8 | [naphthoquinone with CONH-C6H4-NO2, =N-C6H3(CH3)-N(C2H5)(C2H4NHSO2CH3)] | 745 |
| 7-9 | [naphthoquinone with CONH-C6H4-NO2, =N-C6H3(CH3)-N(C2H5)(CH2CHC4H9(n) with C2H5 branch)] | 765 |
| 7-10 | [naphthoquinone with CONH-C6H4-NO2, =N-C6H3(CH3)-N(C2H5(n))(C2H4OC2H4OCH3)] | 750 |
| 7-11 | [naphthoquinone with CONH-C6H4-NO2, =N-C6H3(CH3)-N(C4H9(n))(C2H4OC2H4OCH3)] | 755 |

TABLE 3-continued

| No. | Structural Formula of Dye | Max. Absorption Wavelength (nm) on Thin Film (Applied Film) |
|---|---|---|
| 7-12 | naphthoquinone imine with CONH-C6H4-NO2 and =N-C6H3(CH3)-N(C4H9(n))(C2H4OC2H4OC2H4OC2H5) | 755 |
| 7-13 | naphthoquinone imine with CONH-C6H4-NO2 and =N-C6H3(CH3)-N(C2H4OC2H4OCH3)2 | 740 |
| 7-14 | naphthoquinone imine with CONH-C6H4-NO2 and =N-C6H3(CH3)-N(C2H4OCH2CH=CH2)2 | 740 |
| 7-15 | naphthoquinone imine with CONH-C6H4-NO2 and =N-C6H3(CH3)-N(C2H4OCH3)2 | 740 |
| 7-16 | naphthoquinone imine with CONH-C6H3(CN)(NO2) and =N-C6H3(CH3)-N(C4H9(n))2 | 770 |

TABLE 3-continued
| No. | Structural Formula of Dye | Max. Absorption Wavelength (nm) on Thin Film (Applied Film) |
|---|---|---|
| 7-17 | 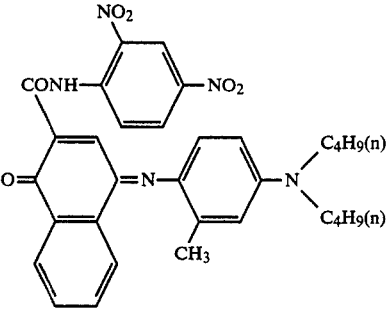 | 772 |
| 7-18 | 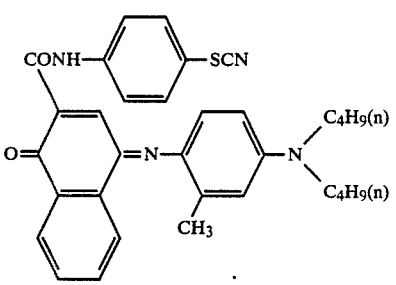 | 745 |
| 7-19 | 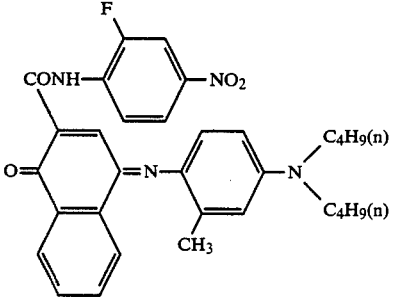 | 766 |
| 7-20 | 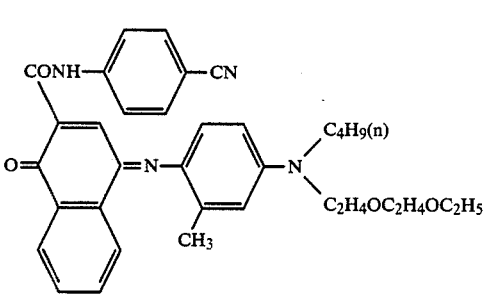 | 735 |
| 7-21 | 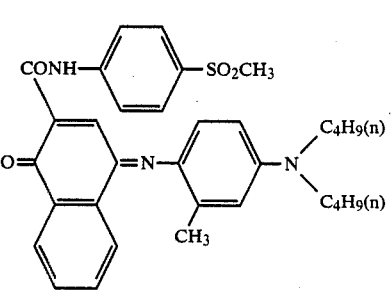 | 735 |

TABLE 3-continued

| No. | Structural Formula of Dye | Max. Absorption Wavelength (nm) on Thin Film (Applied Film) |
|---|---|---|
| 7-22 | (naphthoquinone with CONH-C6H4-SO2C2H4OH and =N-C6H3(CH3)-N(C4H9(n))2) | 735 |
| 7-23 | (naphthoquinone with CONH-naphthyl-SO2C2H4OH and =N-C6H3(CH3)-N(C4H9(n))2) | 737 |
| 7-24 | (naphthoquinone with CONH-C6H4-SO2OC2H4OCH3 and =N-C6H3(CH3)-N(C4H9(n))2) | 736 |
| 7-25 | (naphthoquinone with CONH-C6H4-SO2OCH3 and =N-C6H3(CH3)-N(C4H9(n))2) | 736 |
| 7-26 | (naphthoquinone with CONH-C6H4-SO2CH=CH2 and =N-C6H3(CH3)-N(C2H5)2) | 730 |

TABLE 3-continued

| No. | Structural Formula of Dye | Max. Absorption Wavelength (nm) on Thin Film (Applied Film) |
|---|---|---|
| 7-27 | (structure with CONH-C6H4-COOCH3, naphthoquinone imine, N(C2H5)2, CH3) | 740 |
| 7-28 | (structure with CONH-C6H4-COOC2H4OCH3, naphthoquinone imine, N(C4H9(n))2, CH3) | 742 |
| 7-29 | (structure with CONH-C6H4-COOC2H4OC2H4OC2H5, naphthoquinone imine, N(C4H9(n))2, CH3) | 742 |
| 7-30 | (structure with CONH-C6H4-OC4H9(n), OCH3, naphthoquinone imine, N(C2H5)2, CH3) | 745 |
| 7-31 | (structure with CONH-C6H4-OC2H4OC2H4OCH3, OCH3, naphthoquinone imine, N(C2H5)2, CH3) | 745 |

TABLE 3-continued

| No. | Structural Formula of Dye | Max. Absorption Wavelength (nm) on Thin Film (Applied Film) |
|---|---|---|
| 7-32 | (naphthoquinone imine dye with 2-CONH-C6H4-C5H11(n), 4-position =N-aryl bearing 5-OCH3, 2-CH3, 4-N(C2H5)2) | 742 |
| 7-33 | (naphthoquinone imine dye with 2-CONH-C6H4-NO2(p), 4-position =N-aryl bearing 2-CH3, 4-N(C4H9(n))(C2H4-C6H5)) | 765 |
| 7-34 | (naphthoquinone imine dye with 2-CONH-C6H4-NO2(p), 4-position =N-aryl bearing 5-OCH3, 2-CH3, 4-N(C2H5)2) | 785 |
| 7-35 | (naphthoquinone imine dye with 2-CONH-C6H4-NO2(p), 4-position =N-aryl bearing 5-OCH3, 2-CH3, 4-N(C4H9(n))2) | 788 |
| 7-36 | (naphthoquinone imine dye with 2-CONH-C6H4-NO2(p), 3-OC2H5, 4-position =N-aryl bearing 4-N(C2H5)2) | 779 |

TABLE 3-continued

| No. | Structural Formula of Dye | Max. Absorption Wavelength (nm) on Thin Film (Applied Film) |
|---|---|---|
| 7-37 | (naphthoquinone with CONH-C$_6$H$_4$-NO$_2$; =N-phenyl with N(C$_2$H$_5$)$_2$ and NHCOCH$_3$) | 785 |
| 7-38 | (naphthoquinone with CONH-C$_6$H$_4$-NO$_2$; =N-phenyl with OCH$_3$, N(C$_2$H$_5$)$_2$, NHCOCH$_3$) | 794 |
| 7-39 | (naphthoquinone with CONH-C$_6$H$_4$-NO$_2$; =N-phenyl with N(C$_2$H$_5$)$_2$ and NHCOOC$_2$H$_5$) | 775 |
| 7-40 | (naphthoquinone with CONH-C$_6$H$_4$-NO$_2$; =N-phenyl with OCH$_3$, N(C$_2$H$_4$OC$_2$H$_4$OCH$_3$)$_2$, CH$_3$) | 760 |
| 7-41 | (naphthoquinone with CONH-C$_6$H$_4$-CN; =N-phenyl with OCH$_3$, N(C$_4$H$_9$(n))$_2$, CH$_3$) | 765 |

TABLE 3-continued

| No. | Structural Formula of Dye | Max. Absorption Wavelength (nm) on Thin Film (Applied Film) |
|---|---|---|
| 7-42 | (structure with NO₂, CONH-phenyl, naphthoquinone =N-phenyl with CH₃, N(C₄H₉(n))₂) | 780 |
| 7-43 | (structure with CONH-phenyl-SCN, naphthoquinone =N-phenyl with OCH₃, CH₃, N(C₄H₉(n))₂) | 765 |
| 7-44 | (structure with CONH-phenyl-SO₂CH₃, naphthoquinone =N-phenyl with OCH₃, CH₃, N(C₂H₅)₂) | 755 |
| 7-45 | (structure with SO₂NH-phenyl, naphthoquinone =N-phenyl with CH₃, N(C₄H₉(n))(C₂H₄OC₂H₄OC₂H₅)) | 725 |
| 7-46 | (structure with SO₂NH-phenyl, naphthoquinone =N-phenyl with OCH₃, CH₃, N(C₂H₄OCH₃)₂) | 730 |

TABLE 3-continued
| No. | Structural Formula of Dye | Max. Absorption Wavelength (nm) on Thin Film (Applied Film) |
|---|---|---|
| 7-47 | 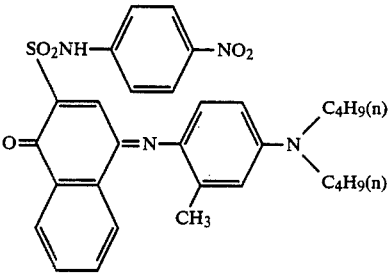 | 750 |
| 7-48 | 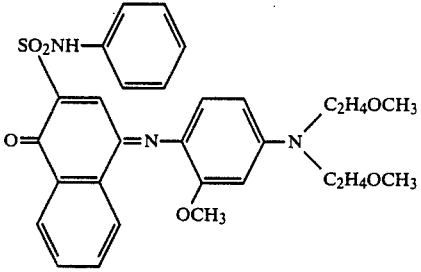 | 725 |
| 7-49 | 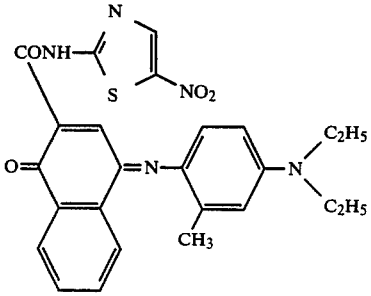 | 745 |
| 7-50 | 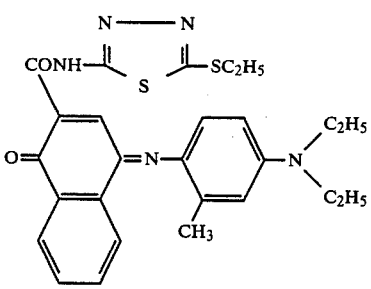 | 740 |
| 7-51 | 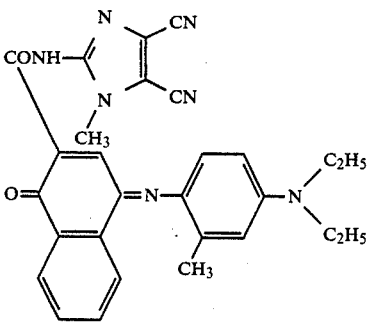 | 745 |

TABLE 3-continued

| No. | Structural Formula of Dye | Max. Absorption Wavelength (nm) on Thin Film (Applied Film) |
|---|---|---|
| 7-52 | (structure: 1-oxo-naphthalene with CONH-(6-nitrobenzothiazol-2-yl) and =N-(2-methyl-4-(N,N-diethylamino)phenyl)) | 743 |
| 7-53 | (structure: 1-oxo-naphthalene with CONH-(6-bromobenzothiazol-2-yl) and =N-(2-methyl-4-(N,N-diethylamino)phenyl)) | 740 |
| 7-54 | (structure: cyclohexadienone with CONH-phenyl and =N-(2-methyl-4-(N-ethyl-N-(C₂H₄OC₂H₄OCH₃))amino)phenyl)) | 740 |
| 7-55 | (structure: cyclohexadienone with CONH-(4-COOC₂H₄OC₂H₅-phenyl) and =N-(2-methyl-4-(N,N-di-n-butylamino)phenyl)) | 758 |
| 7-56 | (structure: cyclohexadienone with CONH-phenyl and =N-(2-methyl-5-methoxy-4-(N,N-di-n-C₂H₉amino)phenyl)) | 759 |

TABLE 3-continued
| No. | Structural Formula of Dye | Max. Absorption Wavelength (nm) on Thin Film (Applied Film) |
|---|---|---|
| 7-57 | 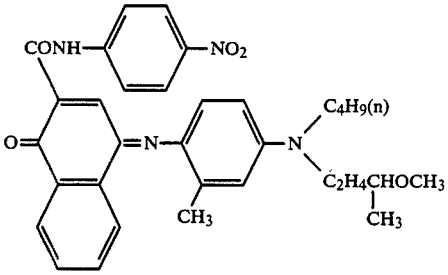 | 755 |
| 7-58 | 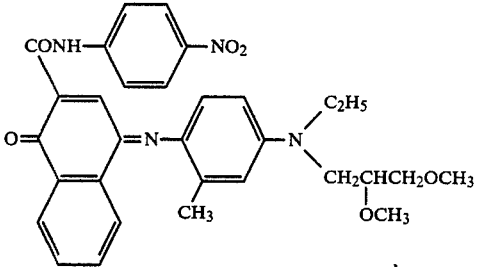 | 745 |
| 7-59 | 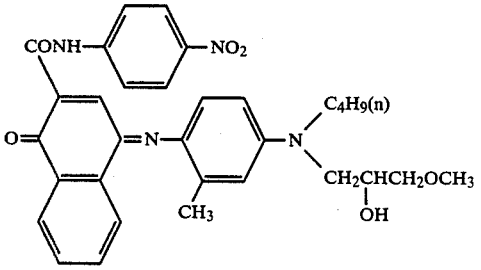 | 750 |
| 7-60 | 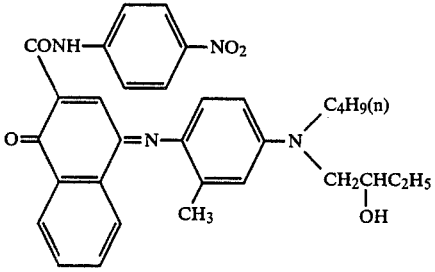 | 750 |
| 7-61 | 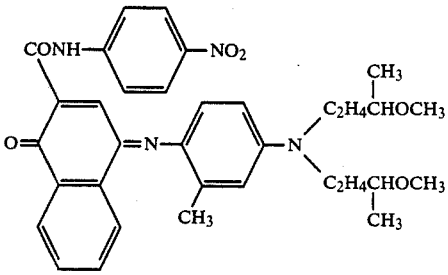 | 750 |

TABLE 3-continued
| No. | Structural Formula of Dye | Max. Absorption Wavelength (nm) on Thin Film (Applied Film) |
|---|---|---|
| 7-62 | 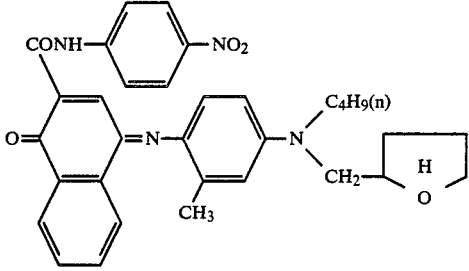 | 750 |
| 7-63 | 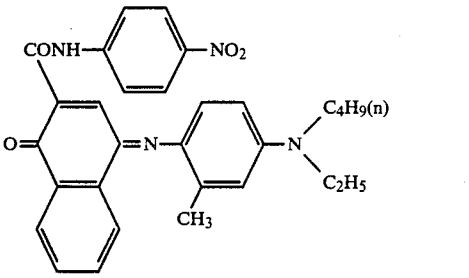 | 760 |
| 7-64 | 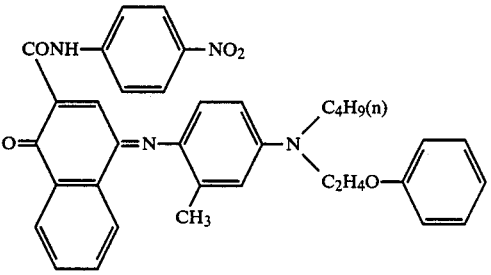 | 755 |
| 7-65 | 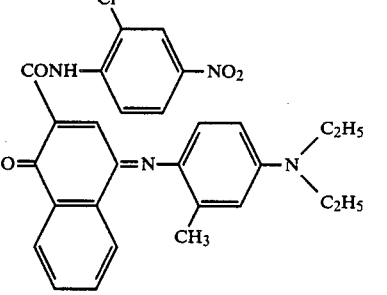 | 735 |
| 7-66 | 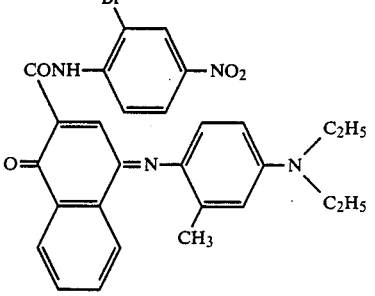 | 735 |

TABLE 3-continued

| No. | Structural Formula of Dye | Max. Absorption Wavelength (nm) on Thin Film (Applied Film) |
|---|---|---|
| 7-67 | 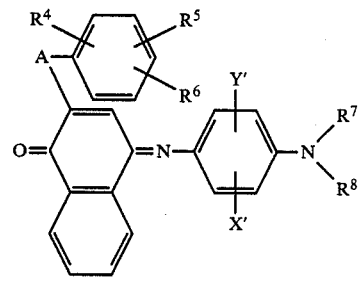 | 735 |

INDUSTRIAL UTILITY

The optical recording medium of the present invention can be provided not only by a method of depositing an indophenol-group dye to a substrate but also by a method of coating by application.

In addition, the optical recording medium according to the present invention has good contrast as shown by C/N ratio because of its high reflectivity, and the reproduction of information recorded on the optical recording medium is simple and clear.

We claim:

1. An optical recording medium comprising an optical recording layer containing an indophenol-group dye and being without silver halide supported on a substrate in which recording is made by thermal transformation of the recording layer with laser beams and reproducing is made by reading a difference of a reflectivity between a non-transformed portion and a transformed portion, said dye having a formula (II):

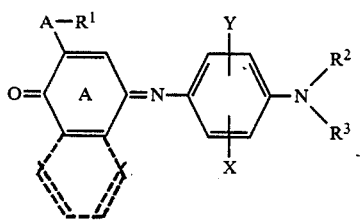

in which 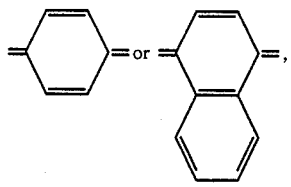 represents

—X and —Y each represents a hydrogen atom, an alkyl group, an acylamino group, an alkoxy group, or a halogen atom, —R$^1$ represents a hydrogen atom; a C$_1$-C$_{20}$ substituted or unsubstituted alkyl group, aryl group or cyclohexyl group; or a substituted or unsubstituted penta- or hexa-heterocyclic residue having a nitrogen atom, an oxygen atom, or a sulfur atom, —R$^2$ and —R$^3$ each represents a hydrogen atom; a C$_1$-C$_{20}$ substituted or unsubstituted alkyl group, aryl group or cyclohexyl group, and —A— represents —CONH—, —NHCO—, —SO$_2$NH—, —NHCONH—, —NHSO$_2$NH—, OR —NHCSNH—.

2. The optical recording medium of claim 1 in which said indophenol-group dye is represented by general formula [III]

[III]

in which —X' and —Y' each represents a hydrogen atom, a C$_1$-C$_4$ alkyl group, a C$_1$-C$_4$ acylamino group, a C$_1$-C$_4$ alkoxy group, or a halogen atom, —R$^7$ and —R$^8$ each represents a hydrogen atom, a C$_1$-C$_{10}$ alkyl group, an aralkyl group, a cyanoalkyl group, or a group represented by —(C$_2$H$_4$O)$_l$R$^9$ (in which —R$^9$ represents a C$_1$-C$_{10}$ alkyl group, and l represents an integer of 6≧l>0), —R$^4$, —R$^5$ and —R$^6$ each represents a hydrogen atom, a nitro group, a cyano group, a thiocyanato group, a halogen atom, an alkyl group, a hydroxy group, a group represented by —(OC$_2$H$_4$)$_m$OR$^{10}$ (in which —R$^{10}$ represents an alkenyl group, or a C$_1$-C$_{10}$ alkyl group, and m represents an integer of 6≧m≧0), a group represented by —CO(OC$_2$H$_4$)$_n$OR$^{11}$ (in which —R$^{11}$ represents an alkenyl group, or a C$_1$-C$_{10}$ alkyl group, and n represents an integer of 6≧n≧0), a group represented by —SO$_2$R$^{12}$ (in which —R$^{12}$ represents a C$_1$-C$_{10}$ alkyl group, a C$_3$-C$_{10}$ alkoxyalkyl group, a C$_2$-C$_{10}$ hydroxyalkyl group, or a vinyl group), or a group represented by —SO$_3$R$^{13}$ (in which —R$^{13}$ represents a C$_1$-C$_{10}$ alkyl group, a C$_3$-C$_{10}$ alkoxyalkyl group, a C$_2$-C$_{10}$ hydroxyalkyl group, or a vinyl group), and —A— represents —CONH—, or —SO$_2$NH—.

3. The optical recording medium of claim 2 in which the indophenol-group dye is represented by said general formula [III] in which at least one substituent of —R$^7$ and —R$^8$ represents a group represented by —(C$_2$-

$H_4O)_{l'}R^9$ (in which —$R^9$ represents the same meaning as defined above, and $l'$ represents an integer of $4 \geq l' \geq 2$).

4. The optical recording medium of claim 3 in which the indophenol-group dye is represented by said general formula [III] in which at least one substituent of —$R^4$, —$R^5$ and —$R^6$ represents a group represented by —$(OC_2H_4)_mOR^{10}$ (in which —$R^{10}$ and m represent the same meaning as defined above), or a group represented by —$CO(OC_2H_4)_nOR^{11}$ (in which —$R^{11}$ and n represent the same meaning as defined above).

5. The optical recording medium of claim 3 in which the indophenol-group dye is represented by said general formula (III) in which —$R^4$, —$R^5$ and —$R^6$ each represents a hydrogen atom, a nitro group, or a cyano group; and one of —X' and —Y' represents a $C_1$-$C_4$ alkyl group.

6. The optical recording medium of claim 5 in which the indophenol-group dye is represented by said general formula (III) in which —A— represents —CONH—.

7. The optical recording medium of claim 5 in which the indophenol-group dye is represented by said general formula (III) in which —A— represents —$SO_2NH$—.

* * * * *